United States Patent
Chen et al.

(10) Patent No.: US 8,224,051 B2
(45) Date of Patent: *Jul. 17, 2012

(54) METHOD FOR DETECTION OF LINEAR STRUCTURES AND MICROCALCIFICATIONS IN MAMMOGRAPHIC IMAGES

(75) Inventors: Shoupu Chen, Rochester, NY (US); Lawrence A. Ray, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 5 days.

This patent is subject to a terminal disclaimer.

(21) Appl. No.: 12/973,035

(22) Filed: Dec. 20, 2010

(65) Prior Publication Data

US 2011/0142323 A1  Jun. 16, 2011

Related U.S. Application Data

(63) Continuation-in-part of application No. 12/624,635, filed on Nov. 24, 2009, which is a continuation-in-part of application No. 11/834,243, filed on Aug. 6, 2007, now Pat. No. 7,899,228, application No. 12/973,035, which is a continuation-in-part of application No. 12/058,803, filed on Mar. 31, 2008.

(51) Int. Cl.
*G06K 9/00* (2006.01)
*A61B 6/00* (2006.01)

(52) U.S. Cl. ............................... 382/128; 382/219; 378/4

(58) Field of Classification Search .................. 382/100, 382/128, 129, 130, 131, 132, 133, 134, 168, 382/156, 170, 181, 190–195, 209, 199, 219, 382/232, 255, 274, 276, 305, 312; 378/4, 378/20, 21, 28

See application file for complete search history.

(56) References Cited

U.S. PATENT DOCUMENTS

| | | | | |
|---|---|---|---|---|
| 6,137,898 | A * | 10/2000 | Broussard et al. | 382/132 |
| 6,748,044 | B2 * | 6/2004 | Sabol et al. | 378/4 |
| 6,819,790 | B2 * | 11/2004 | Suzuki et al. | 382/156 |
| 7,308,126 | B2 * | 12/2007 | Rogers et al. | 382/132 |
| 7,593,561 | B2 * | 9/2009 | Zhang et al. | 382/130 |
| 7,783,089 | B2 * | 8/2010 | Kaufhold et al. | 382/128 |
| 2002/0159622 | A1 * | 10/2002 | Schneider et al. | 382/128 |
| 2009/0041326 | A1 | 2/2009 | Chen et al. | |
| 2009/0041327 | A1 | 2/2009 | Chen et al. | |
| 2010/0104155 | A1 | 4/2010 | Chen et al. | |

OTHER PUBLICATIONS

R. Zwiggelaar, T. C. Parr, and C. J. Taylor, "Finding orientated line patterns in digital mammographic images," Proc. 7th Br. Machine Vision Conf., 1996, pp. 715-724.

(Continued)

*Primary Examiner* — Seyed Azarian

(57) ABSTRACT

A method for detecting a linear structure in a digital mammographic image, using a processor or computer at least in part, locates at least one microcalcification candidate cluster in the image data and extracts a first region of interest that encloses the at least one microcalcification candidate cluster. The first region of interest is processed to identify feature points that correspond to geometric structures in the first region of interest. A linear detection algorithm is applied by a repeated process that selects a line model from a predefined set of line models and analyzes the line model to determine whether a linear structure is present in the first region of interest.

13 Claims, 17 Drawing Sheets

OTHER PUBLICATIONS

N. Cerneaz and M. Brady, "Finding Curvilinear Structures in Mammograms," *Lecture Notes in Computer Science*, 905, pp. 372-382, 1995.

Wai et al, "A Multi-resolution CLS Detection Algorithm for Mammographic Image Analysis," *Medical Imaging Computing and Computer-Assisted Intervention, MICCAU*, pp. 865-872, 2004.

Zhang et al, in their paper "A New False Positive Reduction Method for MCCs Detection in Digital Mammography," *Acoustics, Speech and Signal Processing 2001, Proc. IEEE Intl. Conf. on* (ICASSP), V. 2, Issue 2001, pp. 1033-1036, 2001.

Marin Fischler, et al, "Random Sample Consensus: A Paradigm for Model Fitting with Applications to Image Analysis and Automated Cartography", Graphics and Image Processing, *Commun. ACM*, vol. 24, No. 6, Jun. 1981, pp. 381-395.

Stelios Halkiotis et al., Automatic detection of clustered microcalcifications in digital mammograms using mathematical morphology and neural networks, Signal Processing 87 (2007), pp. 1559-1568.

R. Kimmel et al., "On Edge Detection, Edge Integration and Geometric Active Contours," Proceedings of Int. Symposium on Mathematical Morphology, ISMM2002, Sydney, New South Wales, Australia, Apr. 2002, pp. 37-45.

Michal Holtzman-Gazit et al., "Segmentation of Thin Structures in Volumetric Medical Images," IEEE Trans Image Process, Feb. 2006, 15(2).

\* cited by examiner

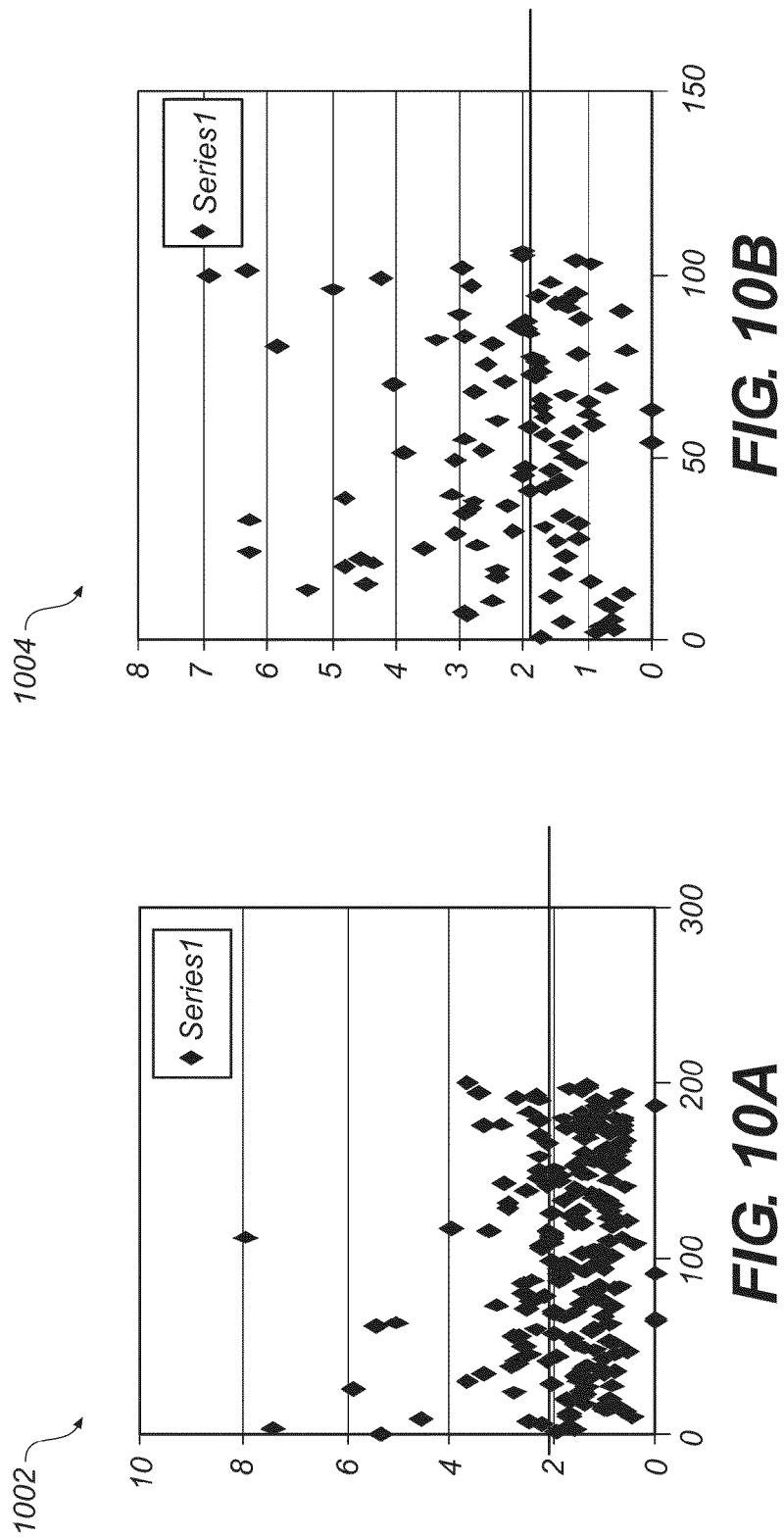

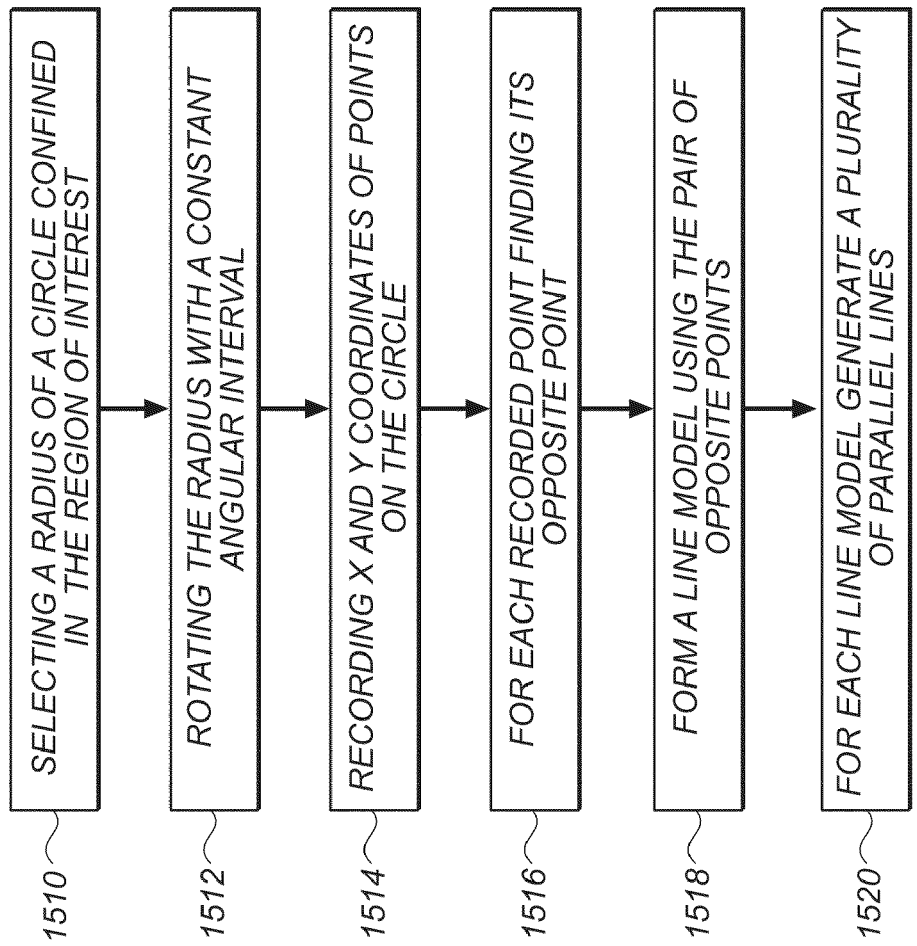

METHOD FOR DETECTION OF LINEAR STRUCTURES AND MICROCALCIFICATIONS IN MAMMOGRAPHIC IMAGES

CROSS REFERENCE TO RELATED APPLICATIONS

This application is a Continuation-in-Part of U.S. patent application Ser. No. 12/624,635 filed Nov. 24, 2009 by Chen et al entitled METHOD FOR DETECTION OF LINEAR STRUCTURES AND MICROCALCIFICATIONS IN MAMMOGRAPHIC IMAGES, which published as US. 2010/0104155; which is a Continuation-in-Part of U.S. patent application Ser. No. 11/834,243 filed Aug. 6, 2007 now U.S. Pat. No. 7,899,228 by Chen et al entitled LINE STRUCTURE DETECTION AND ANALYSIS FOR MAMMOGRAPHY CAD, which published as US 2009/0041326.

This application is a Continuation-in-Part of U.S. patent application Ser. No. 12/058,803 filed Mar. 31, 2008 by Chen et al entitled LINEAR STRUCTURE VERIFICATION IN MEDICAL APPLICATIONS, which published as US 2009/0041327.

The disclosures of these applications are hereby incorporated by reference into the present specification.

FIELD OF THE INVENTION

The invention relates generally to image processing in medical applications, and in particular, to computer aided detection (CAD) in mammography.

BACKGROUND OF THE INVENTION

Mammography is an effective method of screening for breast cancer, a leading cause of mortality among women. However, analyzing mammograms requires skilled radiologists whose performance can be degraded by the demand of viewing a large number of images in a finite amount of time. A CAD feature has been provided in many mammography systems to assist radiologists in capturing true-positives (TP) that might otherwise have been overlooked. For example, see "Automatic detection of clustered microcalcifications in digital mammograms using mathematical morphology and neural networks", by Stelios Hakiotis et al., Signal Processing, Volume 87, Issue 7, July 2007.

Abnormalities visible in mammograms include microcalcifications (MCs), which are tiny deposits of calcium in breast carcinoma. It is very difficult to distinguish between malignant and benign microcalcification clusters (MCCs), even for experienced radiologists, which may lead to a high rate of unnecessary biopsies. Therefore, it is desirable to design the CAD algorithm in such a way that a high TP rate can be achieved while the number of false-positives (FPs) is kept to a minimum. It has been noted that many FP MCC candidates as selected by known mammography CAD systems were found to fall on linear normal structures such as blood vessels in digital or film-based mammograms. Thus, it has been recognized that removing those MCC candidates that are associated with linear structures will significantly reduce the overall FP rate.

Various methods for extracting linear structures from a mammographic image have been proposed. R. Zwiggelaar, T. C. Parr, and C. J. Taylor, in their article "Finding orientated line patterns in digital mammographic images," *Proc. 7th Br. Machine Vision Conf.,* 1996, pp. 715-724, have compared the performance of several different approaches (including orientated bin and line operator methods) to the detection of linear structures with synthetic mammographic images. Their results suggest significant differences between the different approaches. One approach has been implemented as a multi-scale line operator and gives intuitively convincing results. The output could be used for classifying linear structures.

The work of a line operator can be described as follows: The line operator takes the average grey level of pixels lying on an oriented local line passing through a target pixel and subtracts the average intensity of all the pixels in the locally oriented neighborhood. The line strength is compared for n orientations. Line direction is obtained from the orientation producing the maximum line strength. Scale information can be obtained by applying the line operator to images that are resealed by Gaussian smoothing and sub-sampling. For each pixel, the scale producing the maximum line strength is taken as the detected line scale.

N. Cemeaz and M. Brady, in their article "Finding Curvilinear Structures in Mammograms," *Lecture Notes in Computer Science,* 905, pp. 372-382, 1995, introduced a method that estimates the intensity profile of curvilinear structures (CLS) in mammograms in a single scale. In this method, the CLS are assumed to have circular cross section when the breast is not compressed. And the cross section of CLS in a mammogram is assumed to be elliptical. Candidate pixels for CLS are detected using the response of a second order difference operation which is applied in four directions. If there is a sufficient high response for one of the orientations the pixel will form part of a CLS. A measure of line strength is obtained by determining the contrast of the line profile at these pixels.

Wai et al, in their article "A Multi-resolution CLS Detection Algorithm for Mammographic Image Analysis," *Medical Imaging Computing and Computer-Assisted Intervention, MICCAU,* pp. 865-872, 2004' adopted the two-step method from the work of Cemeaz and Brady and devised a multi-resolution ridge detector for structures ranging from 1800 microns to 180 microns. Wai et al also enhanced the performance of the detector by using a local energy thresholding to suppress undesirable response from noise. The local energy is also used to determine CLS junctions.

Alexander Schneider et al, in U.S. Patent Application Publication No. 2002/0159622, proposed a system and method for detecting lines in medical images. In their method, a direction image array and a line image array are formed by filtering a digital image with a single-peaked filter; convolving the regular array with second-order difference operators oriented along the horizontal, vertical and diagonal axes; and computing the direction image arrays and line image arrays as direct scalar functions of the results of the second order difference operations. As best understood by Applicants, line detection based on the use of four line operator functions requires fewer computations than line detection based on the use of three line operator functions, if the four line operator functions correspond to the special orientations of 0, 45, 90 and 135 degrees.

For the issue of FP reduction, Zhang et al, in their paper "A New False Positive Reduction Method for MCCs Detection in Digital Mammography," *Acoustics, Speech and Signal Processing* 2001, *Proc. IEEE Intl. Conf. on* (ICASSP), V. 2, Issue 2001, pp. 1033-1036, 2001, described a mixed feature multistage FP reduction algorithm utilizing eleven features extracted from spatial and morphology domains. These features include gray-level description, shape description and clusters description; but no feature is directly related to linear structures. Wai et al mention in their article that the results from the multi-resolution ridge detector could be beneficial to microcalcification FP reduction but the realization of the reduction is absent. Moreover, Wai et al say that it is computationally inefficient to generate actual linear structures just for the purpose of confirming the association of an MCC candidate with a linear structure in mammography CAD.

There exists a need for an improved approach for image linear structure detection in mammography.

SUMMARY OF THE INVENTION

The present invention is designed to overcome the problems set forth above. More particularly, with the present invention, all MCC candidates are assumed to be associated with linear structures until verified otherwise. Therefore, the present invention provides a method for detection of linear structures in mammography CAD systems with the objective of reducing MCC FPs.

According to one aspect, the present invention provides a method for detecting a linear structure in a digital mammographic image, the method using a processor or computer at least in part, and comprising: locating at least one microcalcification candidate cluster in the image data; extracting a first region of interest that encloses the at least one microcalcification candidate cluster; processing the first region of interest to identify feature points that correspond to geometric structures in the first region of interest; and applying a linear detection algorithm by a repeated process that comprises: (i) selecting a line model from a predefined set of line models; (ii) analyzing the line model to determine whether a linear structure is present in the first region of interest.

The processing step may comprise steps of generating a gradient magnitude region of interest from the first region of interest; and generating a binary region of interest containing the feature points from the gradient magnitude region of interest. The line detection algorithm may be a modified RANSAC algorithm. The analyzing step may comprise steps of: computing a first integral curve in a direction parallel to a line determined by the line model; computing a second integral curve in a direction perpendicular to the line determined by the line model; computing a first peak to peak value for the first integral curve; computing a second peak to peak value for the second integral curve; and computing an identifiable value from a ratio of the first peak value to the second peak value, the identifiable value being indicative of whether a true linear structure is present in the first region of interest.

The identifiable value may be used in a classifier together with other identifiable intensity and geometrical values to detect microcalcifications in the image. The method may further comprise a step of training the classifier with the identifiable values.

In the various embodiments of the inventive method, the digital mammographic image may be a digitized X-ray film mammogram, or a digital mammogram captured with a computerized radiography system, or a digital mammogram captured with a digital radiography system.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

FIG. 10A shows a chart that displays identifiable values for a plurality of ROIs that contain linear structures; and FIG. 10B shows a chart that displays identifiable values for a plurality of ROIs that do not contain linear structures.

FIG. 15 is an illustration of an embodiment for computing line models.

DETAILED DESCRIPTION OF THE INVENTION

Figure 1:
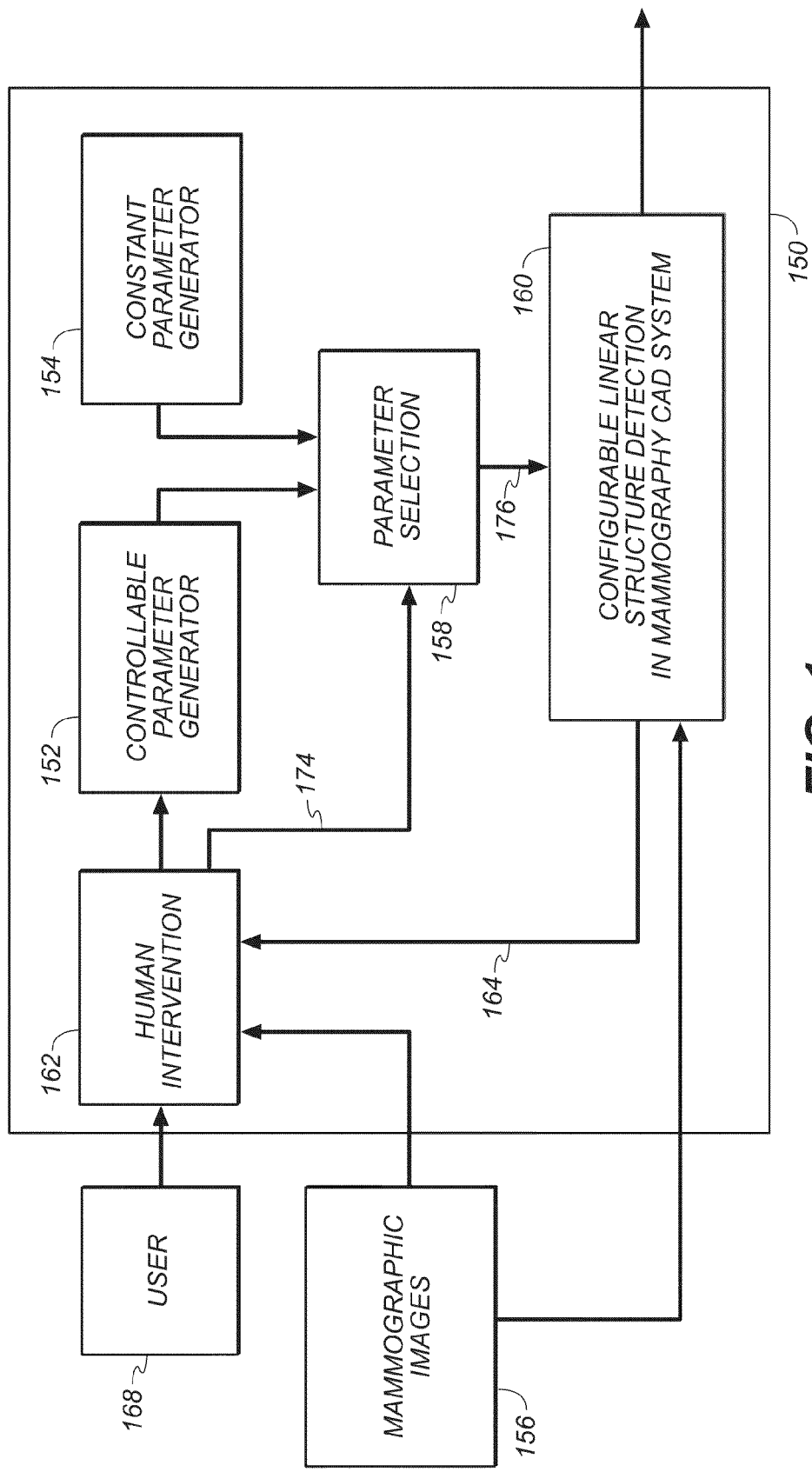
FIG. 1 is an illustration of an embodiment of the method of the invention for detection of linear structures in mammographic images.

The following is a detailed description of the preferred embodiments that use the current invention, reference being made to the drawings in which the same reference numerals identify the same elements of structure in each of the several figures.

Where they appear in the present disclosure, the terms "first", "second", and so on, do not necessarily denote any ordinal or priority relation, but may be used for more clearly distinguishing one element or time interval from another.

In FIG. 1, the method of the present invention will be outlined. FIG. 1 is a work flow chart 150 illustrating an embodiment that employs the linear structure detection method of the present invention. There are many variations in appearance of linear structures in mammograms in terms of contrast, brightness, texture and morphological shapes, among others. Therefore, in a practical image processing system it is desirable, as one measure, to synergistically integrate the skills of the human operator of the system with the power of the computer in the process of linear structure detection. A typical human excels in creativity, use of heuristics, flexibility and common sense; while a computer excels in speed of computation, strength and perseverance. This synergy of human and computer can be realized by incorporating a detection parameter control into the process.

In FIG. 1, there are provided steps of parameter selection 158 and human intervention 162 that allow a human operator or user 168 to participate in the process loop. Parameter selection step 158 allows selection of a set of parameters either from a known constant parameter generator 154 or a known controllable parameter generator 152. The process begins with an initial set of default parameters being selected automatically by the system. The results of selection are conveyed to the user preferably though a graphical display. The user responds to the display by indicating displayed results that need refinement. One way to accomplish this is for the user to graphically note on the display features that are not part of a linear structure. This makes use of the user's high level knowledge, and does not require the user to delve into directly setting parameters. Parameter selection step 158 sends the selected parameters to a configurable linear structure detection step 160 according to the invention, through a forward path 176. Controllable parameter generator 152 is manipulated by operator 168 through a human intervention step 162. Operator 168 receives information on mammographic images from input 156 or feedback on path 164 from detection step 160. Then the operator makes a decision to use parameters either from constant parameter generator 154 or from controllable parameter generator 152. For instance, the initial linear structures identified may contain pixels that the user can quickly and qualitatively determine should not be considered by the computer. These features ideally should be considered as outliers by the computer, but as misclassified and hence used in the parameter estimation. These features can be eliminated by the user for consideration by the computer and a new set of parameters may be estimated.

A feature of the embodiment that uses the present invention is that it provides an integrated solution to the linear structure detection problem by constructing a configurable detection system with a configurable verifier. This configurable system can be configured or reconfigured by commands from operator 168 through a command path 174. In general, the configurable verifier can be used in different positions in a workflow (or equivalently, forming different workflows).

Figure 2A:
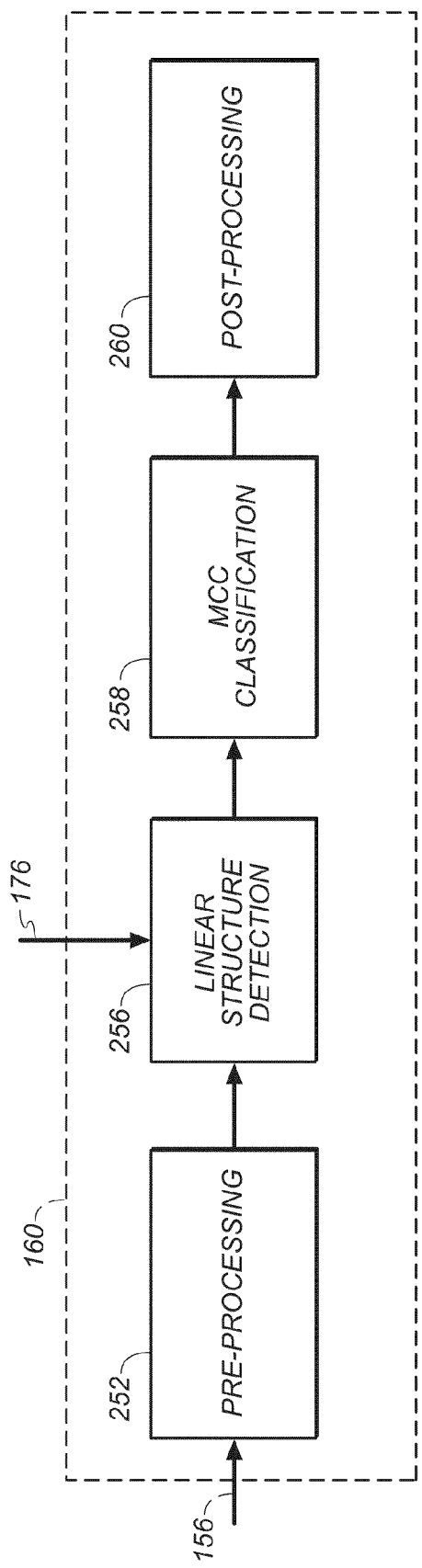
FIGS. 2A and 2B are illustrations of exemplary workflows of an embodiment of the method of the current invention.
Figure 2B:
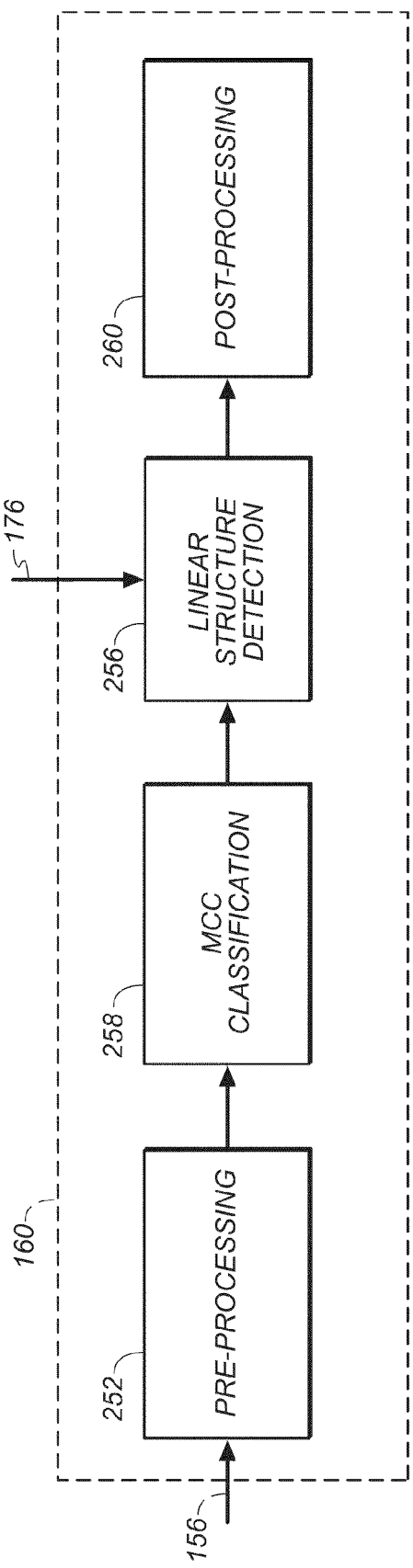

Exemplary workflows for detection step 160 are depicted in FIGS. 2A and 2B. In FIG. 2A, mammographic images on input 156 are first processed in pre-processing step 252 that applies various known image processing algorithms such as filtering, morphological processing, feature extraction, etc. to the incoming images to form MCCs. Referring to FIG. 2A, for a first exemplary workflow from linear structure detection step 256 to MCC classification step 258, the MCCs enter step 256 followed by step 258 that classifies the MCCs into malignant or benign types. The above described workflow provides linear structure detection prior to MCC classification. Referring to FIG. 2B, for a second exemplary workflow, the MCCs enter the classification step 258 first, followed by the linear structure detection step 256. The FIG. 2B work flow thus provides linear structure detection after MCC classification. The output from either of the exemplary workflows goes to a post-processing step 260 that consolidates cancer detection results from other detection modules (such as mass lesion detection, not discussed in the present invention) in the mammography CAD system.

The use of the exemplary workflow 256 to 258 of FIG. 2A reduces the computational burden of step 258 in terms of the number of MCCs to be classified since step 256 removes a sizable quantity of MCCs from the candidate list. It does, however, require the CAD classifier in step 258 to be retrained if the linear structure detection 256 is an add-on step. The use of the exemplary workflow 258 to 256 of FIG. 2B enables a kind of 'plug and play' feature for the mammography CAD system if linear structure detection step 256 is an add-on step. It does not require the CAD classifier in step 258 to be retrained. Linear structure detection step 256 in FIG. 2B only processes those MCCs that are classified as true positives by MCC classification step 258.

Persons skilled in the art understand that a mammography CAD system can be designed in such a way that the functionalities provided by linear structure detection step 256 can be part of the functionalities provided by MCC classification step 258. In other words, steps 256 and 258 can be combined into a single unit. Persons skilled in the art can design an MCC classifier or the equivalent that has the capability of verifying linear structures for use in accordance with the present invention. In other words, linear structure detection step 256 and MCC classification step 258 can be combined into a single process.

In step 256, the linear structure detection itself can be configured or reconfigured to have various functional combinations by commands from operator 168 through command path 174 via parameter selection step 158. Step 158 sends the selected parameters to step 160 through path 176. For example, to be detailed later, the linear structure verifier for step 160 can be configured so that a function of TP protection is activated in the linear structure detection process. The linear structure verifier can also be configured by commands from operator 168 so that different operational points can be realized. Exemplary operational points are numerical thresholds that are used in cascade rule based detection.

Figure 3A:
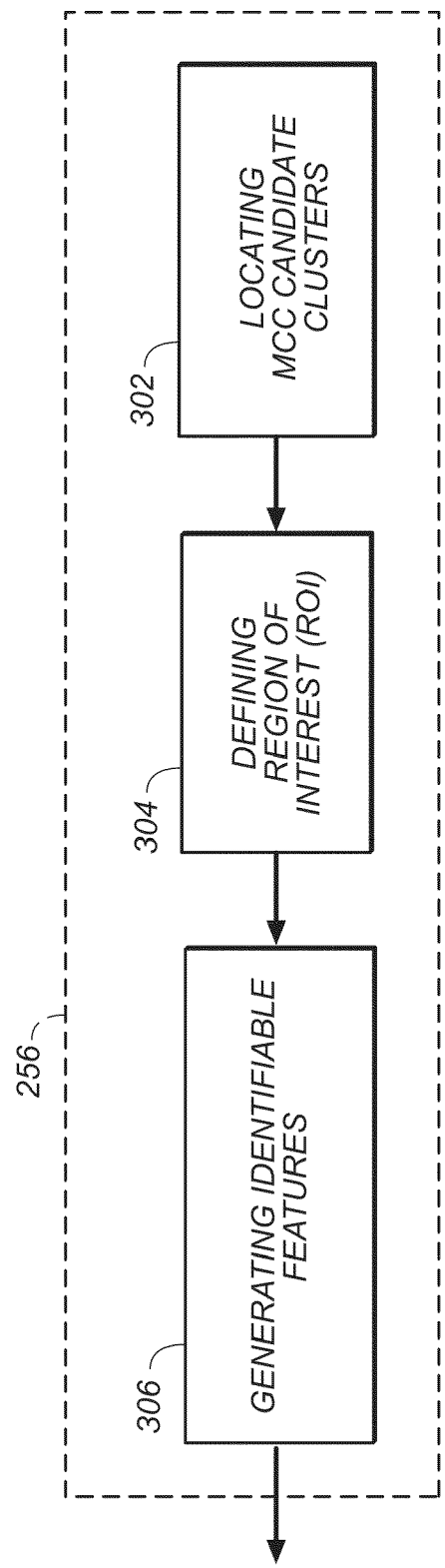
FIG. 3A is an illustration of an embodiment of the method of the invention using an MCC candidate driven linear structure detection in mammographic images.

FIG. 3A depicts an embodiment of a method according to the invention of a workflow chart for an MCC candidate driven, line structure detection step 256 for mammographic images. An exemplary linear structure verifier includes algorithm steps 302, 304, and 306 and can be used as step 256 in step 160. Step 302 receives mammographic images which can be digitized X-ray film mammograms, digital mammograms captured with computerized radiography systems or mammographic images captured with digital radiography systems. In step 302, a plurality of known image processing and computer vision procedures are applied to the input mammographic images to identify clusters of connected pixels that present characteristics which are similar to those of MCCs in the mammogram. Exemplary characteristics known to persons skilled in the art can be statistical moments derived from pixel values in intensity (including intensity derivatives), spatial frequency, and topological domains. Step 302 forms MCC candidates using the identified clusters of connected pixels. The clusters of connected pixels that form MCC candidate clusters are also called MCC candidate spots. Each MCC candidate formed in step 302 has a plurality of MCC candidate spots that are close to each other within a certain distance.

In step 304, a region of interest (ROI) is defined in the mammographic image. The center of an ROI is the center of an MCC candidate. The size of an ROI is selected appropriately to enclose all the MCC candidate spots in an MCC candidate. An exemplary size is 200 by 200 in image pixels.

Figure 3B:
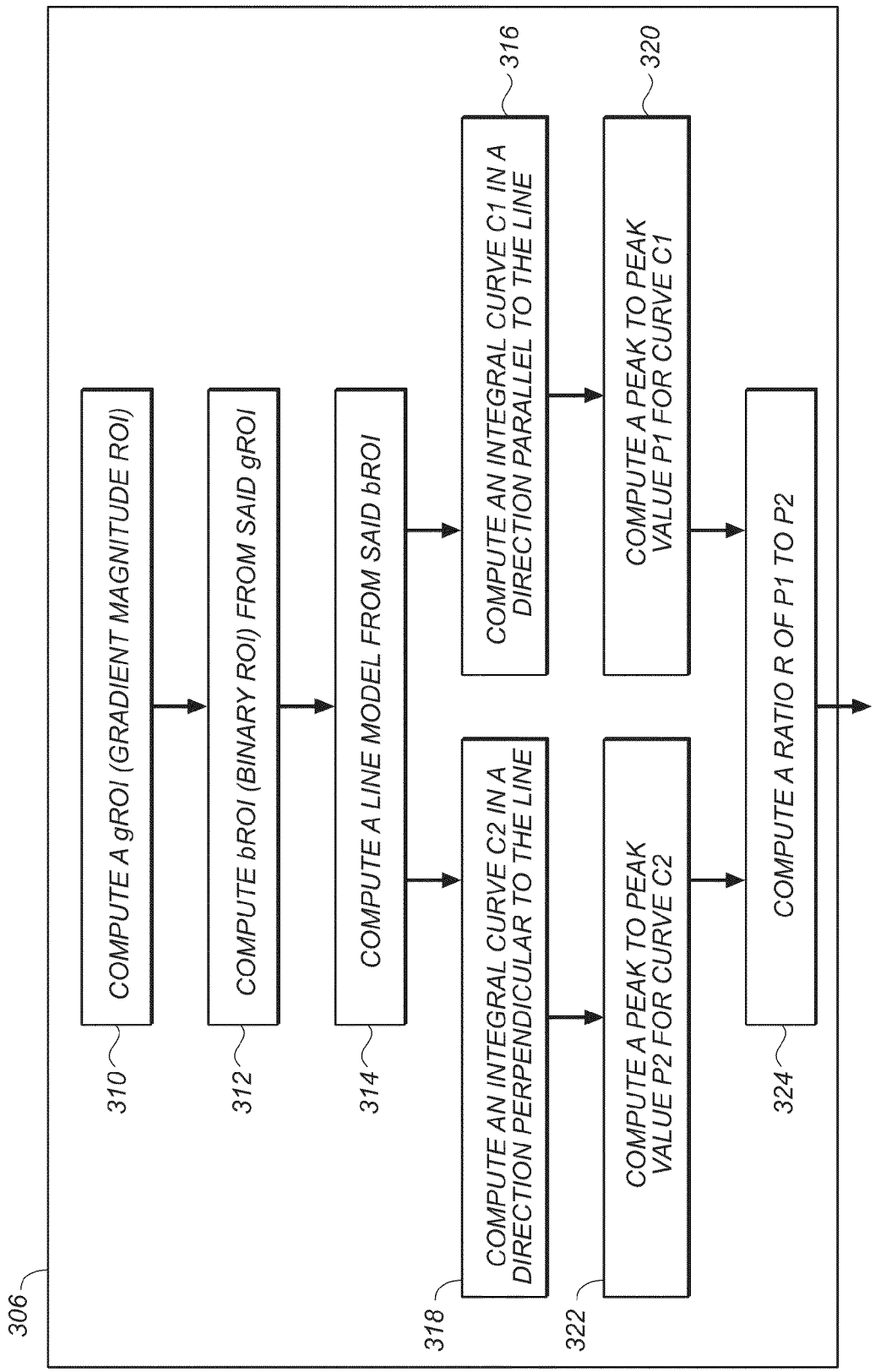
FIG. 3B is an illustration of an embodiment of computing an identifiable value.

In step 306, the ROI will be processed and an identifiable value to be used in step 258 or step 260 will be determined using the process of FIG. 3B.

Curvilinear structures appear in the mammographic images due to the curvilinear appearance of blood vessels, lactation ducts, and ligaments of the breast as projected on a mammogram. Vascular lines are large calcified blood vessels on a mammogram. MCCs appear as bright spots on mammograms and usually are the only signs indicating early breast cancers. MC spots appear usually in clusters, and malignant MCC spots usually have irregular shapes. The curvilinear structure is a net of massive and complex curvilinear markings on a given mammogram. Due to the projection of three-dimensional breast into a two-dimensional mammogram, different parts of the curvilinear structure may have different appearances with varying width, lengths and different contrasts to the surrounding breast tissue. The option of pre-classification global mask generation to extract curvilinear structure may be of limited use because global curvilinear marking is a massive structure, and accurate mask extraction is not an easy task. Global mask tends to extract only small portion of linear structure or extract too many "lines".

Figure 4B:
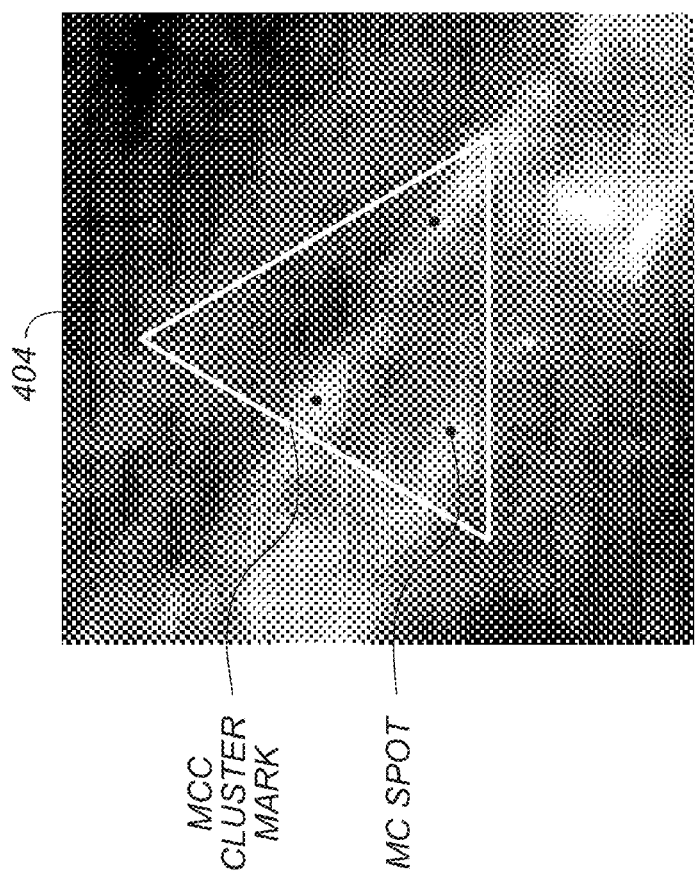
FIGS. 4A and 4B respectively show a mammogram and an enlarged region of interest in the mammogram illustrating exemplary MCC candidate clusters.
Figure 4A:
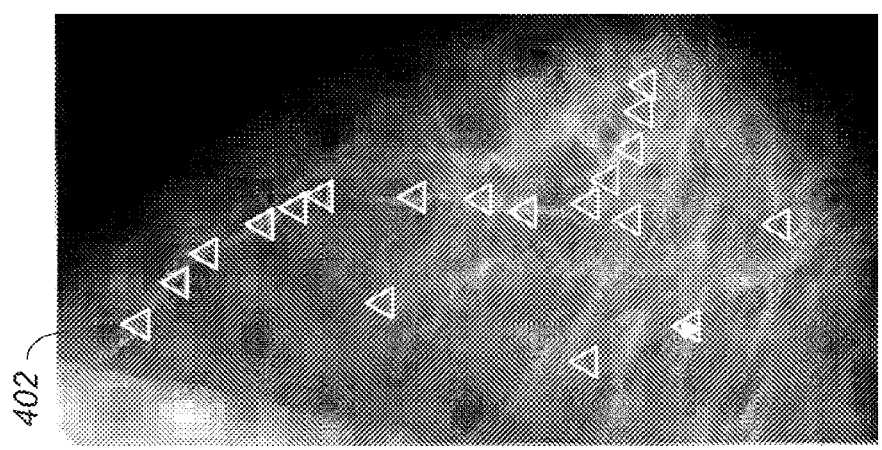

In accordance with the invention, an alternative to extracting curvilinear structures is, after initial MCC candidate classification as in step 258, to identify linear structures only in the neighborhood where the MCC candidates reside. For each of the MCC candidates that have passed initial classification, a region of interest (ROI) is defined that encloses the MCC candidate spots of each of the MCC candidates. Further, and in accordance with the invention, an MCC FP reduction procedure, or equivalently, an MCC candidate driven linear structure detection procedure, is applied to a small region (ROI) centered around each MCC candidate. Processing time thus is reduced since the number of MCC candidates is limited and only a small portion of the breast area needs to be processed, in comparison to global line mask approach. FIG. 4A shows an exemplary mammogram 402 with small triangles that indicate the MCC candidates identified as previously described in the pre-processing state, before any MCC classification. FIG. 4B shows an enlarged image 404 of the ROI that contains one of the MCC candidate clusters. The MCC FP reduction procedure will be applied to only a fraction of all MCC candidate clusters indicated in FIG. 4A.

Figure 5B:
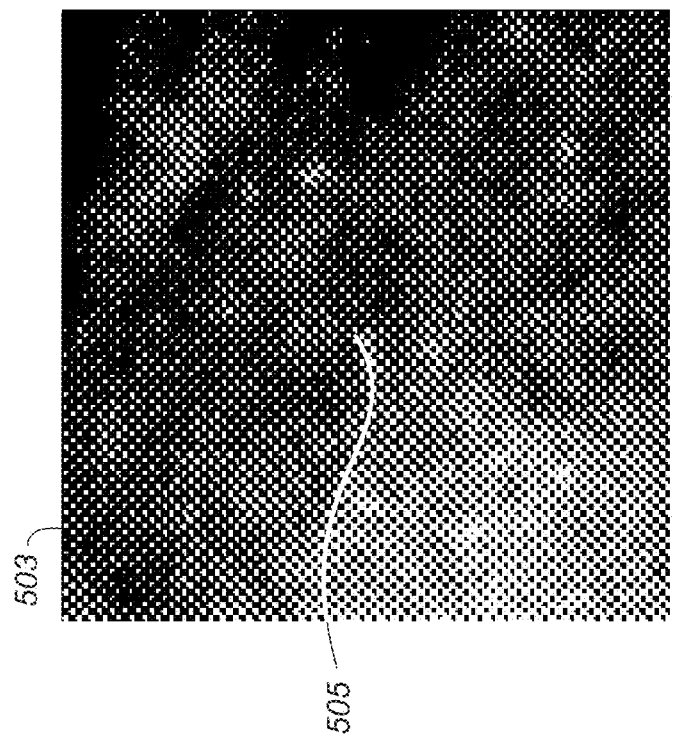
FIG. 5B shows an exemplary ROI that does not contain a linear structure.
Figure 5A:
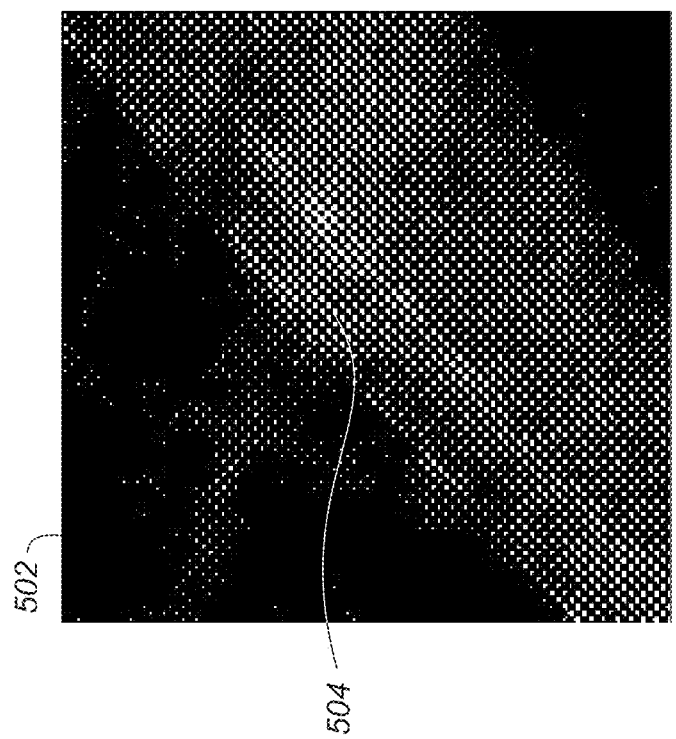
FIG. 5A shows an exemplary ROI (region of interest) that contains a linear structure.

The MCC candidate driven linear structure detection method of the present invention will be detailed next. FIG. 5A shows an exemplary ROI 502 that contains a linear structure 504; and FIG. 5B shows an exemplary ROI 503 that does not contain linear structures in area 505. The corresponding gradient magnitude ROI (gROI) 804 of ROI 502 is shown in FIG. 8B. As illustrated in FIG. 3B, a gROI is computed in step 310 using a gradient magnitude operation known to persons skilled in the art. In general, ROI and gROI are gray scale images. The gROI image is further processed by adaptive thresholding in step 312 to produce a binary image bROI in which each pixel has one of two values, e.g. 0 or 1. In step 312, a threshold is determined dynamically based on the intensity values of all the pixels in the gROI image. If a pixel value exceeds the threshold in the gROI image then the corresponding pixel in bROI image is set to 1; otherwise, the corresponding pixel in bROI is set to 0. Non-zero pixels constitute a type of feature points to be used to detect the linear structures. Some non-zero pixels may correspond to MCCs.

Figure 6B:
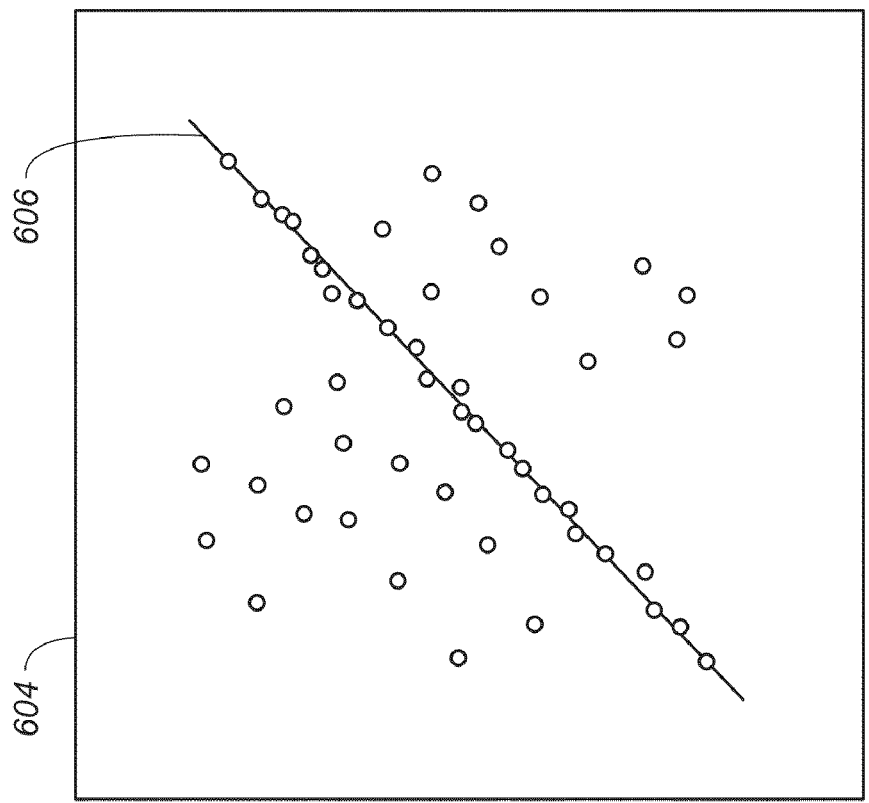
FIG. 6B shows the line model associated with the bROI after applying a RANSAC line detection algorithm.
Figure 6A:
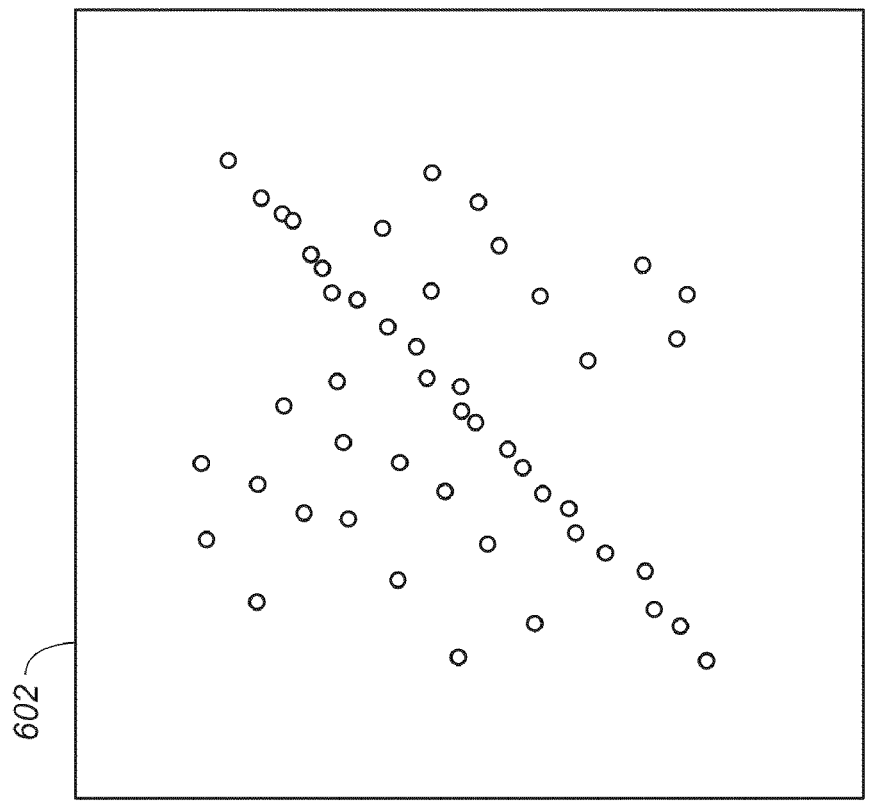
FIG. 6A shows a simulated bROI (binary region of interest) that contains a linear structure.

In step 314 a line model is computed using the pixels in the bROI image. One line detection algorithm to compute the line model is the RANSAC algorithm ("Random Sample Consensus: A Paradigm for Model Fitting with Applications to Image Analysis and Automated Cartography", by Marin Fischler, et al, Graphics and Image Processing, *Commun. ACM*, Vol. 24, No. 6, June 1981, pp. 381-395. Graph 602 in FIG. 6A displays a simulated bROI image with a line associated with random noise content. Graph 604 in FIG. 6B shows the resulting image after applying the RANSAC algorithm to the simulated bROI image. The straight line 606 represents the line model generated by the RANSAC algorithm. A line model is essentially defined based on two parameters, one is the orientation of the line section and the other is the center of the line section. The line model defines a number of parallel and perpendicular lines based on the line section orientation, as described in more detail subsequently.

Figure 7:
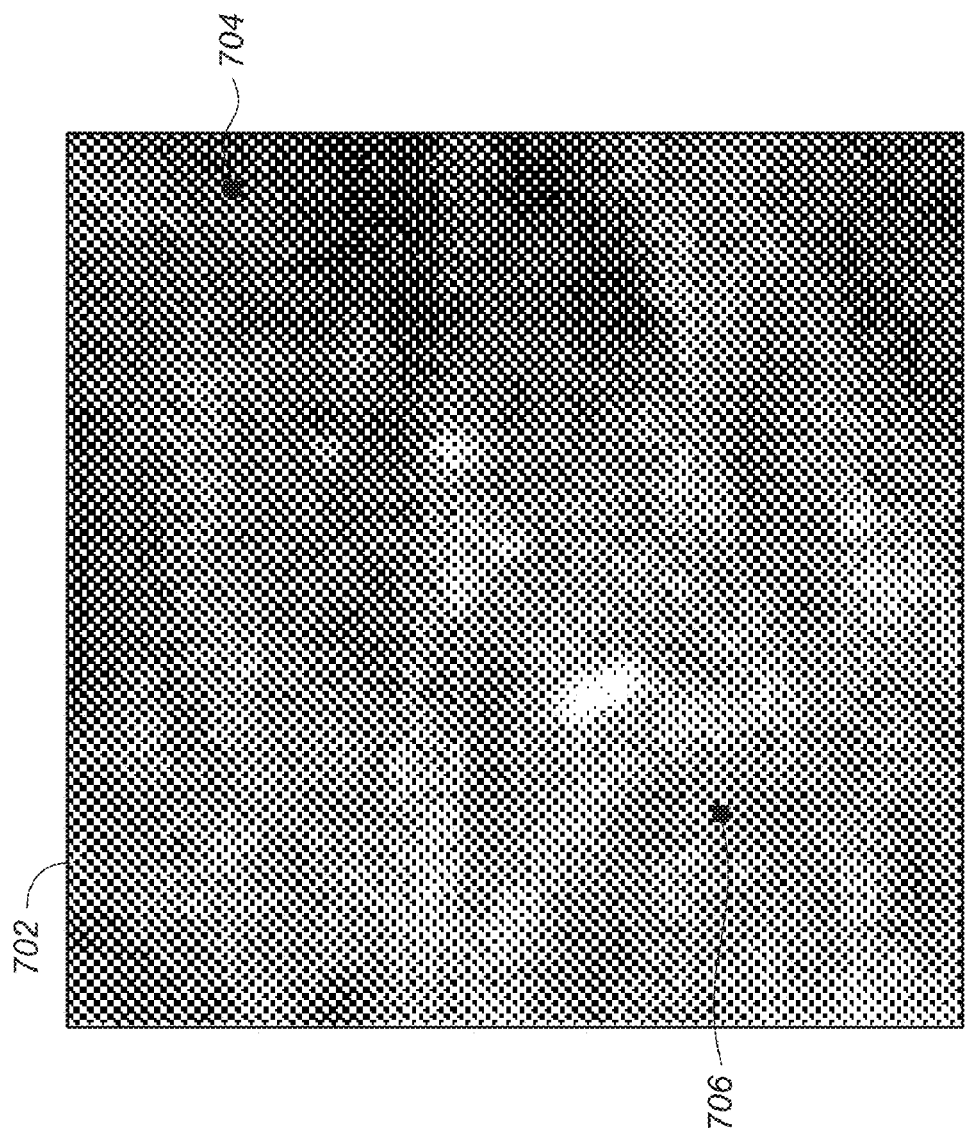
FIG. 7 shows the result after applying a RANSAC line detection algorithm to an ROI that does not contain line structures.

RANSAC is a robust algorithm for detecting line structures in an image. One difficulty is that the RANSAC algorithm always produces a line model even if there are no explicit line structures in an image. For example, the ROI image 702 in FIG. 7 contains no obvious line structures, but the RANSAC algorithm still generates a line model between two indicative spots 704 and 706 that are generated by RANSAC processing. Mathematically, two points define a line (orientation) in a two dimensional space. Essentially, indicative spots 704 and 706 are not MC candidate spots although they may happen to be in the locations where MC candidate spots reside. Also, the algorithm removes from the list an MCC candidate, not individual MC candidate spots, although removing an MCC candidate also removes its spots. Thus, in this example, ROI image 702 might be removed erroneously from the candidate list.

A method is thus devised in this invention to determine if the line model produced by the RANSAC algorithm indicates a true line structure. The method essentially describes a model that uses a line-guided linear structure detection. The inventive method now is explained. For an exemplary case of ROI 502 that contains a linear structure 504 as seen in FIG. 5A, the method includes the following steps as illustrated in FIG. 3B.

In step 316 an integration curve C1 is computed in a direction parallel to the line detected by the RANSAC algorithm. The direction for computing C1 is indicated by an arrow 808 in FIG. 8B. The line is a collection of spots 806 which are part of the feature points. The integral curve C1 is indicated by plot 814 in FIG. 8C.

In practice when using the line model, a point on curve C1 and plot 814 is the average value of all the pixel values on the corresponding line of the line model that is parallel to the line detected by the RANSAC algorithm (not shown explicitly but indicated by spots 806).

In step 318, another integration curve C2 is computed in a direction 810 shown in FIG. 8B that is perpendicular to the line detected by the RANSAC algorithm. In practice, a point on curve C2 is the average value of all the pixel values on the corresponding line that is perpendicular to the line detected by the RANSAC algorithm (not shown explicitly but indicated by spots 806). The integral curve C2 is indicated by plot 816 in FIG. 8C.

In step 320, the method computes a peak to peak value P1 of plot 814 for curve C1. In step 322, a peak to peak value P2 is computed of plot 816 for curve C2. In step 324 an identifiable value R is computed that is the ratio of P1 to P2 for the case ROI 502.

For another exemplary case of ROI 503 that does not contain a linear structure but does contain random spots (not illustrated), the method operates as follows:

In step 316 an integration curve C1 is computed in a direction parallel to the line detected by the RANSAC algorithm. The direction for computing C1 is indicated by an arrow 908 in FIG. 9B. The line is a collection of candidate spots 906. The integral curve C1 is indicated by plot 914 in FIG. 9C.

In practice, a point on curve C1 and plot 914 is the average value of all the pixel values on the corresponding line that is parallel to the line detected or defined by the RANSAC algorithm (not shown explicitly but indicated by spots 906).

Figure 9C:
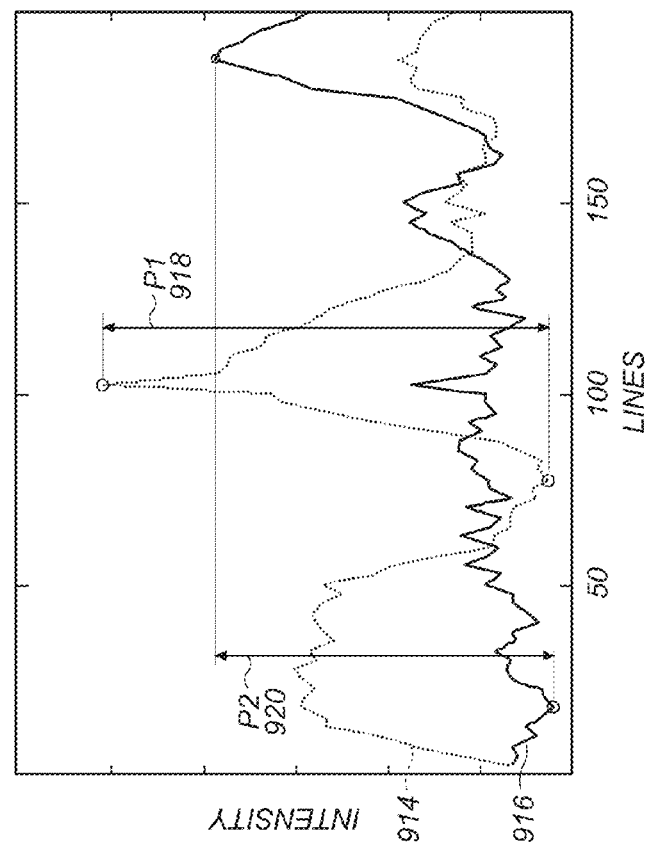
FIG. 9C shows two integral curves and their associated features computed from the gROI of FIG. 9B.
Figure 9A:
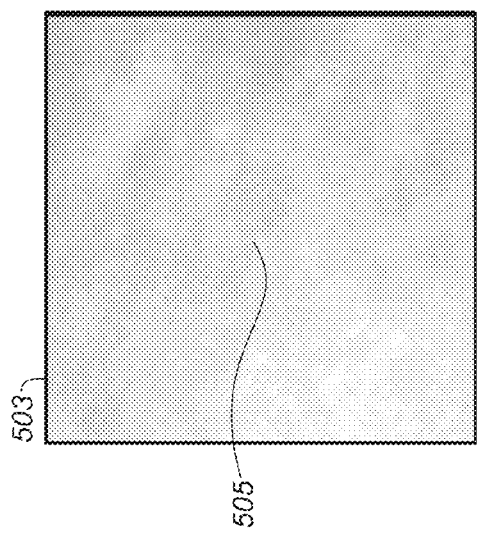
FIG. 9A shows an ROI as in FIG. 5B that does not contain a linear structure.
Figure 9B:
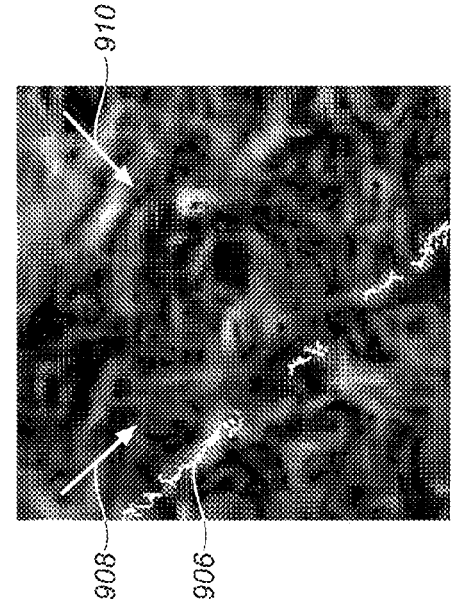
FIG. 9B shows a gROI of the ROI of FIG. 9A.

In step 318, another integration curve C2 is computed in a direction 910 as shown in FIG. 9B that is perpendicular to the line detected by the RANSAC algorithm. In practice, a point on curve C2 is the average value of all the pixel values on the corresponding line that is perpendicular to the line detected or defined by the RANSAC algorithm (not shown explicitly but indicated by spots 906). The integral curve C2 is indicated by plot 916 in FIG. 9C.

In step 320 the method computes a peak to peak value P1 of plot 914 for curve C1. In step 322, a peak to peak value P2 is computed of plot 916 for curve C2.

In step 324 an identifiable value R is computed that is the ratio of P1 to P2 for the case ROI 503 in which RANSAC has generated indicative spots, not illustrated, in the manner previously discussed.

For the conventional RANSAC algorithm, the computation of a line model in step 314 of FIG. 3B randomly selects a pair of points from the binary region of interest bROI itself. For those skilled in the art, it is readily understood that randomly selecting different pairs of points for different rounds of testing may be effective for detecting a line structure as long as the different pairs of points happen to reside within the same line structure. However, in practice, the ratio R of P1 to P2 computed in step 324 can differ for the different test rounds on the same image due the different pairs of points involved. This can lead to some inconsistency in the final cancer detection results provided by the conventional RANSAC approach. Because different points can be used to define the same linear structure in different test runs, executing the RANSAC algorithm multiple times on the same image data can yield slightly different R values. This inconsistency presents difficulties for classification algorithms, for example. In addition, inconsistent behavior of this type complicates attempts to train a diagnostic analysis routine using neural network and other advanced programming techniques. A better alternative is to use a method that maintains the same ratio R value when the same line structure is detected.

Figure 13A:
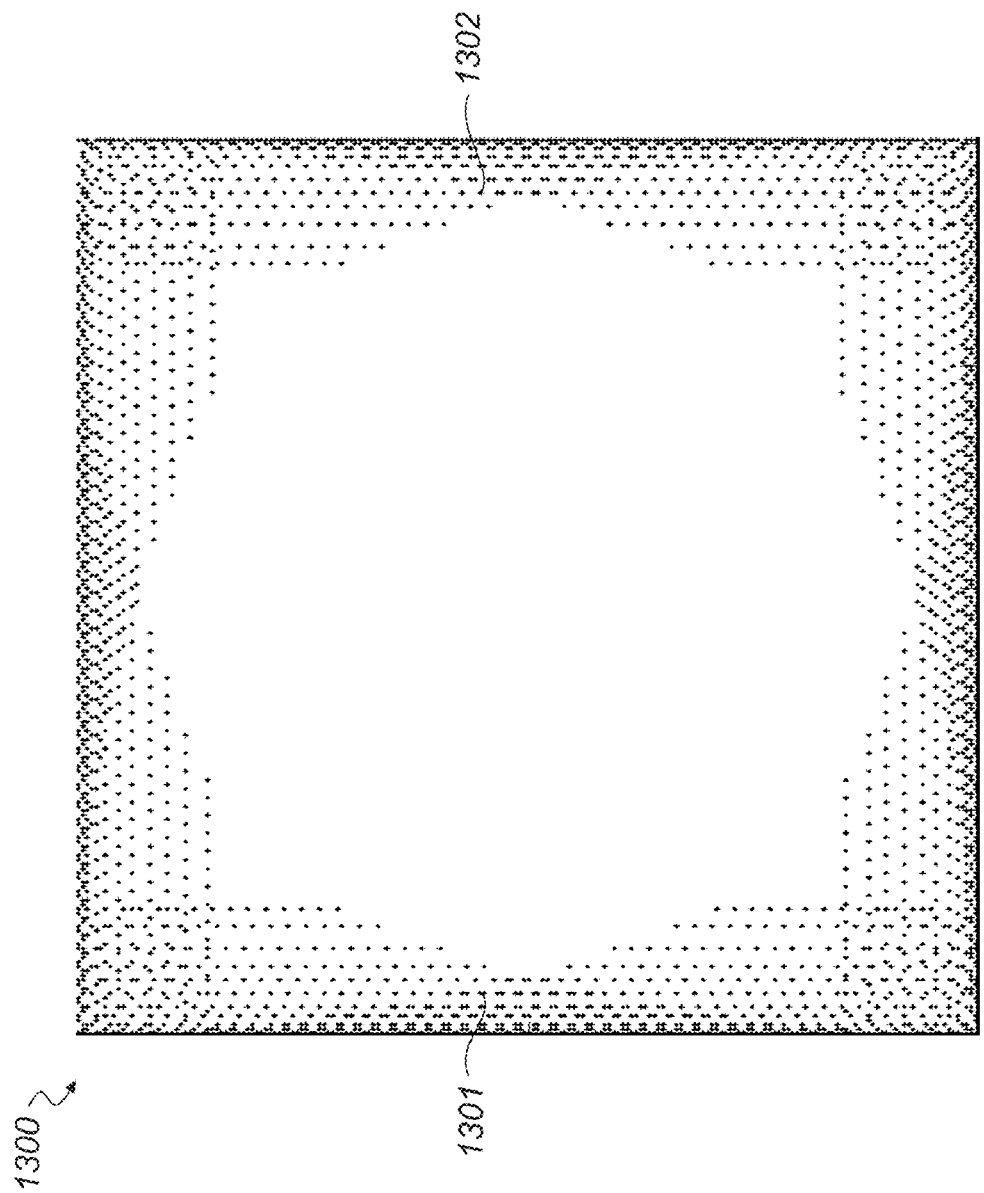
FIGS. 13A and 13B show a chart of points usable for obtaining pre-computed line models.

To achieve this, the method used in embodiments of the present invention significantly modifies the conventional RANSAC algorithm. Using the improved linear detection algorithm of the present invention, the line model is not computed from random selection of data points in the region of interest bROI, as in the conventional RANSAC sequence described earlier. Instead, embodiments of the present invention iteratively test for linear features using a set of pre-computed line models. This more deterministic approach can help to reduce the likelihood of inconsistency. In one embodiment, the template shown in FIG. 13A shows points 1301 and 1302 that are paired and used for defining a discrete set of exemplary line models 1300, described in more detail subsequently. Exemplary line models 1300 are defined using a template in one embodiment.

Figure 13B:
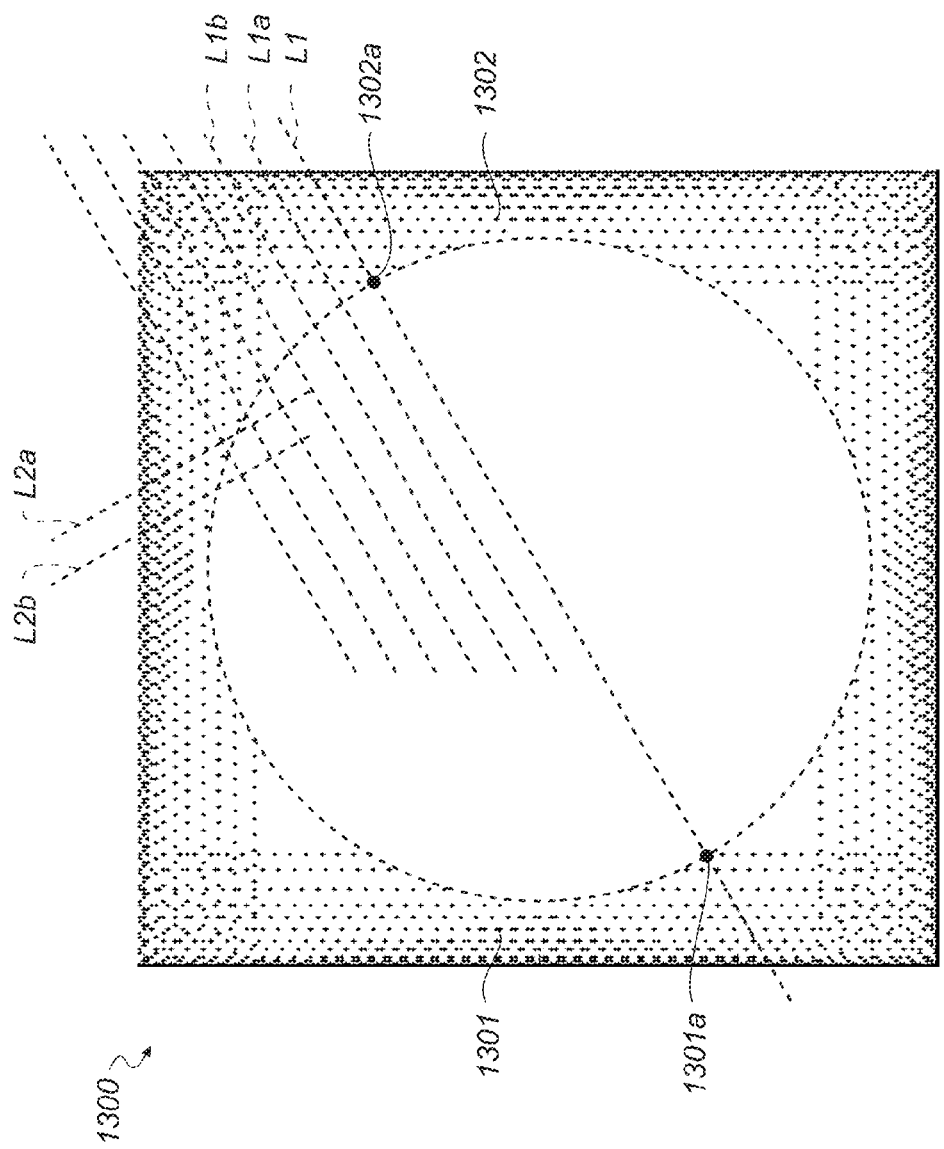

Referring to FIG. 13B, a point 1301a near one edge of a region of interest, as defined by a circular area and shown within a dashed circle, is paired with a point 1302a that lies opposite point 1301a with respect to the circle. To form the line model, points 1301a and 1302a define a line L1. Parallel lines such as L1a and L1b (one pixel apart in practice, but shown separated by an exaggerated distance in FIG. 13B) can then be defined as well as perpendicular lines L2a, L2b, and so on. In this way, paired points 1301a and 1302a define a line model that can be used for identifying line structures used in subsequent processing.

Figure 14:
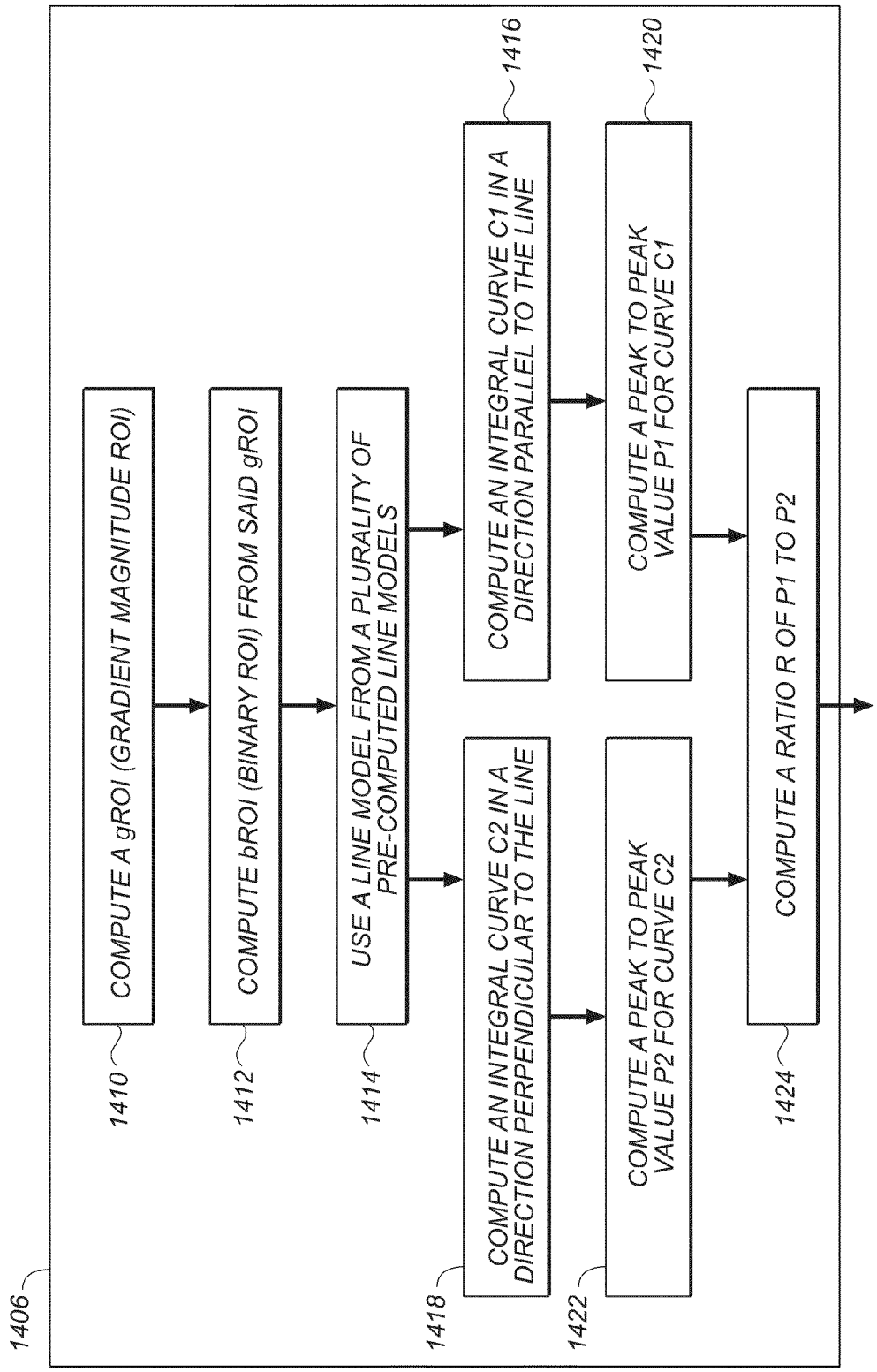
FIG. 14 is an illustration of an embodiment of computing an identifiable value.

As illustrated in FIG. 14, a gROI is computed in step 1410 of an algorithm 1406 for determining the ratio R value using a gradient magnitude operation known to those skilled in the imaging arts. In general, ROI and gROI images are gray scale images. The gROI image is further processed by adaptive thresholding in step 1412 to produce a binary image bROI in which each pixel has one of two values, e.g. 0 or 1. In step 1412, a threshold is determined dynamically based on the intensity values of all the pixels in the gROI image. If a pixel value exceeds the threshold in the gROI image, then the corresponding pixel in the bROI image is set to 1; otherwise, the corresponding pixel in the bROI image is set to 0. Non-zero pixels resulting from this processing constitute a type of feature points that can be used to detect the linear structures. Some of these non-zero pixels may then correspond to MCCs.

In step 1414 of FIG. 14, a line model is picked from the set of pre-computed line models, as described in more detail subsequently. The preferred line detection algorithm for computing each line model is a modified version of the RANSAC algorithm ("Random Sample Consensus: A Paradigm for Model Fitting with Applications to Image Analysis and Automated Cartography", by Marin Fischler, et al, Graphics and Image Processing, *Commun. ACM*, Vol. 24, No. 6, June 1981, pp. 381-395. Steps 1414 and following are repeated for each line model selected from the plurality of available line models.

Figure 8C:
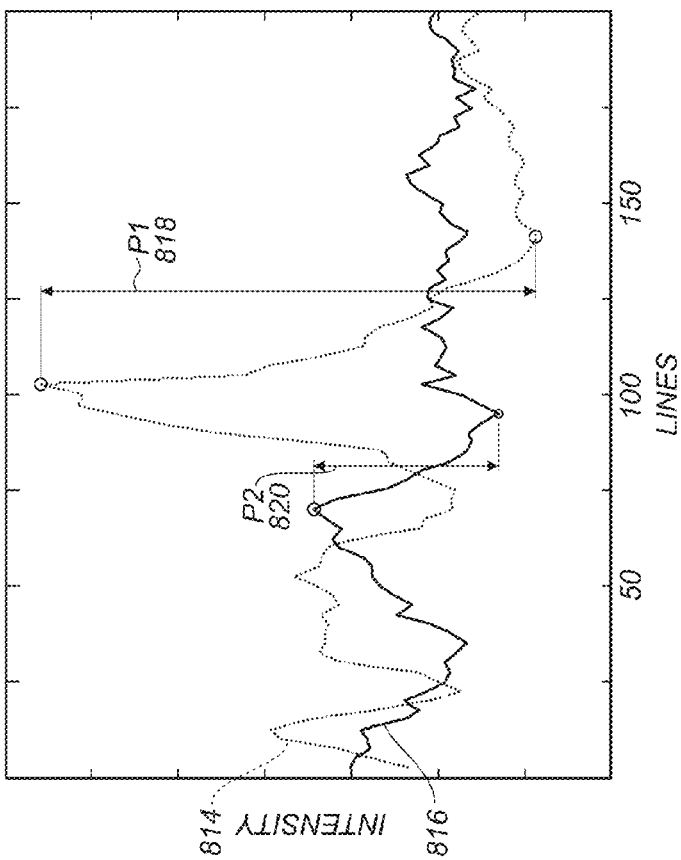
FIG. 8C shows two integral curves and their associated features computed from the gROI of FIG. 8B.
Figure 8A:
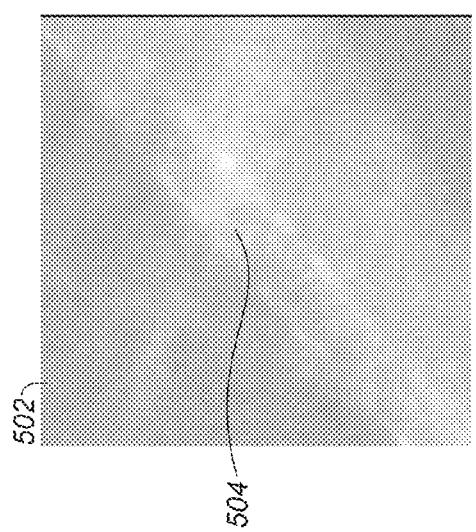
FIG. 8A shows an ROI as in FIG. 5A that contains a linear structure.
Figure 8B:
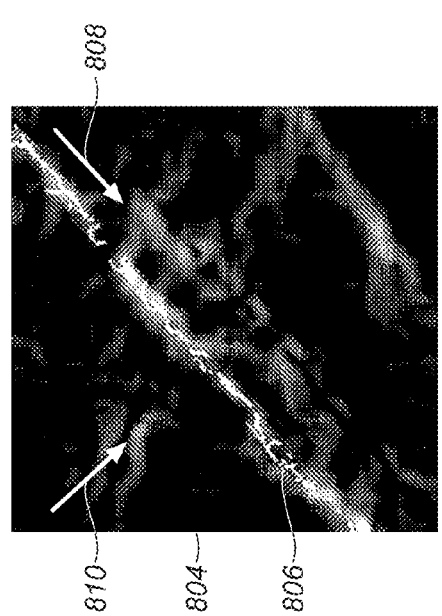
FIG. 8B shows a gROI (gradient magnitude region of interest) of the ROI of FIG. 8A.

In step 1416 of FIG. 14, an integration curve C1 is computed, as indicated by plot 814 in FIG. 8C. Each integration curve C1 value is formed by summing values taken along multiple lines, each of the multiple lines parallel to the line model obtained by the modified RANSAC algorithm with each line shifted from its neighboring lines by the distance of at least one pixel. Lines used by the line model are defined as described earlier with reference to FIGS. 13A and 13B. The direction for adjacent parallel lines used in computing curve C1 is indicated by an arrow 808 in the example of FIG. 8B. The line that is shown in FIG. 8B is a collection of spots 806 that are feature points. The integral curve C1 for this example is indicated by plot 814 in FIG. 8C.

In practice, referring again to FIG. 8C, each point on curve C1 and plot 814 is the average value of all the pixel values on one corresponding line of pixels that is parallel to the line detected by the modified RANSAC algorithm (not shown explicitly in FIG. 8B but indicated by spots 806). As can be expected, lines that extend through spots 806 have a higher average, defining a peak that provides the value of P1 in FIG. 8C.

In step 1418 of FIG. 14, another integration curve C2 is computed in a direction that is perpendicular to the detected line in the line model defined by the modified RANSAC algorithm. In the example of FIG. 8B, this is shown as a direction 810. In practice, a point on curve C2 is the average value of all the pixel values on the corresponding line that is perpendicular to the line detected by the modified RANSAC algorithm (not shown explicitly but indicated by spots 806). The integral curve C2 is indicated by plot 816 in FIG. 8C. Curve C2 (plot 816) has, in this particular example, lower average intensity than curve C1 (plot 814), defining a lower peak value that provides the value of P2 in FIG. 8C.

In step 1420 of FIG. 14, the method computes a peak to peak value P1, shown as 818 in FIG. 8C, of plot 814 for curve C1. In step 1422, a peak to peak value P2, shown as 820, is computed from plot 816 for curve C2.

In step 1424 of FIG. 14, an identifiable value R is computed as the ratio of P1 to P2 for ROI 502 at the given line model. Repeating this sequence of steps for a set of line models pre-defined at different angles yields a maximum R value for ROI 502.

FIG. 9A shows another exemplary case with an ROI 503 that does not contain a linear structure but does contain some number of random spots (not shown in FIG. 9A). The method operates as follows:

In step 1416 of FIG. 14, an integration curve C1 is computed in a direction parallel to the line defined by the modified RANSAC algorithm. The direction for computing C1 is indicated by an arrow 908 in FIG. 9B. Here, the line is a collection of candidate spots 906. The integral curve C1 is indicated by plot 914 in FIG. 9C.

In practice, with reference again to FIG. 9C, each point on curve C1 and plot 914 is the average value of all the pixel values on one corresponding line of pixels that is parallel to the line defined by the modified RANSAC algorithm (not shown explicitly in FIG. 9B but indicated by spots 906). As can be expected, lines that extend through spots 906 have a higher average, defining a peak that provides the value of P1 in FIG. 9C.

In step 1418 of FIG. 14, another integration curve C2 is computed in a direction 910 as shown in FIG. 9B that is perpendicular with respect to the line model defined by the modified RANSAC algorithm. In practice, a point on curve C2 is the average value of all the pixel values on the corresponding line that is perpendicular to the detected line in the line model defined by the modified RANSAC algorithm (not shown explicitly but indicated by spots 906). The integral curve C2 is indicated by plot 916 in FIG. 9C.

In step 1420 the method computes a peak to peak value P1, shown as 918 in FIG. 9C, of plot 914 for curve C1. In step 1422, a peak to peak value P2, shown as 920, is computed from plot 916 for curve C2.

In step 1424 of FIG. 14, an identifiable value R is computed as the ratio of P1 to P2 for ROI 503 using the given line model. Repeating this sequence of steps for a set of line models yields a maximum R value for ROI 503.

As noted earlier and shown with particular reference to FIGS. 13A and 13B, embodiments of the present invention employ a set of pre-computed line models such as that provided by a template. This approach differs from the conventional RANSAC algorithm that produces a line model during line detection. The modified RANSAC processing in this invention produces line models before line detection begins in the conventional RANSAC sequence.

Figure 12:
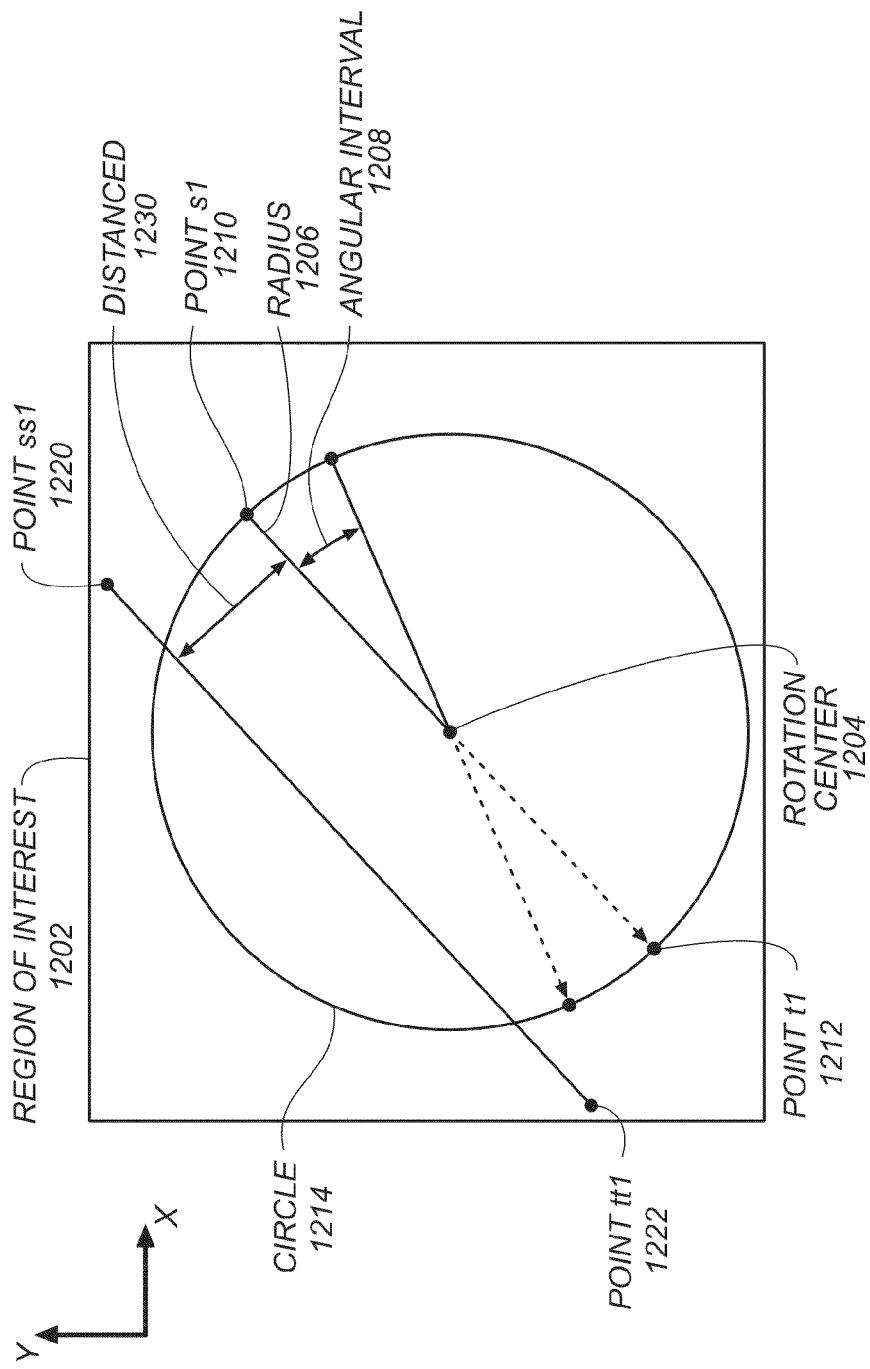
FIG. 12 is an illustration of generating line models.

Referring now to FIGS. 12, 13A, 13B, and 15, a method of pre-computing line models is described. An initial step 1510 selects a radius of a circle that lies within the ROI. Referring to FIG. 12, the task of pre-computing line models starts with selecting a radius of a circle 1214 confined in the region of interest 1202 such as image 804 (FIG. 8B) in step 1510. An exemplary radius 1206 is shown.

Using the center of the region of interest 1202 as a rotation center 1204, rotating the radius 1206 either clockwise or counter clockwise (step 1512), such as between 0 and 180 degrees, with a constant discrete angular interval 1208, a plurality of points such as s1 will be generated along the periphery of circle 1214.

In step 1514 of FIG. 15, the horizontal x and vertical y coordinates of points (such as s1 1210) according to the rotation are recorded. For each recorded point such as s1 1210 on the circle, its opposite point (t1 1212) on the circle with respect to the center of the rotation 1204 is computed in a step 1516. These two points (s1 and t1) form a pair of points which, in turn, defines a line model in a step 1518.

For each line model such as the line model governed by points s1 and t1, a plurality of parallel lines are generated for the line model in a step 1520 (FIG. 15), as was described with reference to FIG. 13B. One such parallel line in the line model is indicated by two points ss1 1220 and tt1 1222 in FIG. 12. Adjacent parallel lines in the line model are separated from each other by a constant Euclidean distance d 1230, as shown in FIG. 12.

By way of example, the template of FIG. 13A shows an arrangement of pre-defined points 1301 and 1302 that are used to define a line model. These points, arranged about a generally circular ROI, are used to help provide improved consistency in line detection results.

Graph 1002 in FIG. 10A depicts a collection of R values computed by the method in this invention for a plurality of ROIs that contain no linear structures. Graph 1002 shows that for ROIs that contain no linear structures, as in this example, R values generally remain below an exemplary value of 2.

By comparison, graph 1004 of FIG. 10B depicts a collection of R values computed by the method of the present invention for a plurality of ROIs that are known to contain linear structures. Graph 1004 shows that for ROIs that contain linear structures, over half of the R values are above an exemplary value of 2. This identifiable value R can be used directly in post processing step 260 (FIG. 2B) to determine if a positively classified MCC is in fact associated with a linear structure.

Figure 11B:
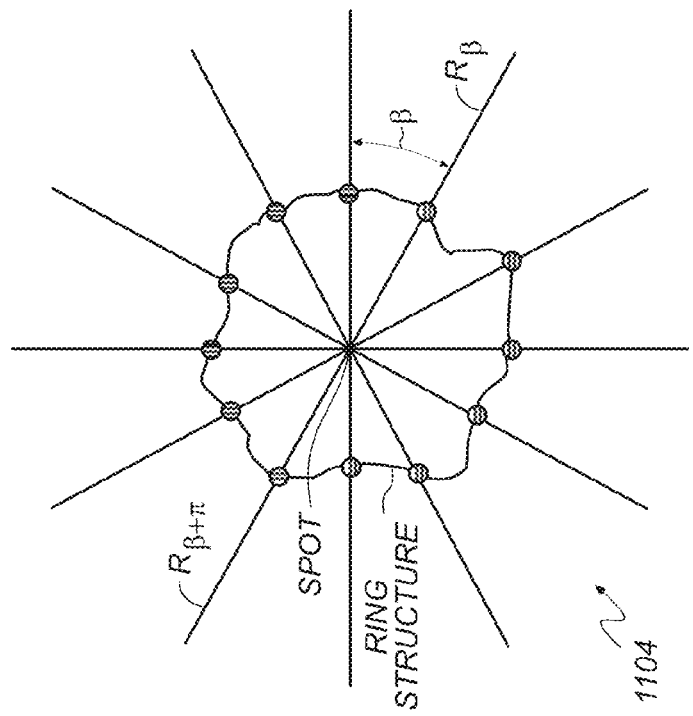
FIG. 11B shows a graph illustrating a ring-like structure search method.
Figure 11A:
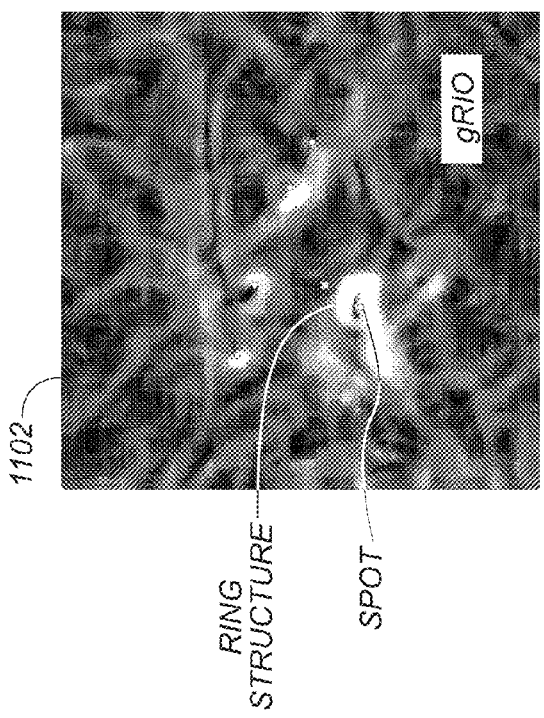
FIG. 11A displays an exemplary gROI with ring-like structure.

Applicants have observed that some of the TP MCCs may reside in an area where linear structure-like objects are present and can be verified as FPs. It also has been observed that TP MCCs may possess topological ring-like structures surrounding some of the spots. For example, see gROI 1102 in FIG. 11A. A method in accordance with one embodiment of the invention is hence crafted to take advantage of the ring structure in a cluster to protect TPs.

Using the spot as the origin, a search is performed along a ray that radiates from the origin until the ray hits the ring or reaches a predefined distance without a hit. The search process can be formulated as follows, referring to graph 1104 in FIG. 11B:

Denote a ray by $R_{k\beta}$ and its opposite ray by $R_{k\beta+\pi}$, where $\beta=\pi/N_R$; $k\in[1,\Lambda, N_R]$. $N_R$ is a positive integer greater than one. Denote a hit array by $T=\{t_k\}$. The array elements $t_k$ are initialized as zero. Only if both $R_{k\beta}$ and $R_{k\beta+\pi}$ hit a ring, the corresponding array element $t_k$ will be set to one, otherwise, the corresponding array element $t_k$ remains zero.

A measure is therefore defined as the sum of hits $\xi_1$ that a hit array has. The measure is simply computed as $$\xi_t = \sum_k t_k.$$

This measure as an identifiable value is also included in the MCC detector training process for a classifier, together with the identifiable value R and other identifiable values in the intensity and geometrical spaces known to persons skilled in the art, in MCC classification step 258 to classify MCC candidates into malignant or benign types. The classifier is first trained on sample ground truths using these identifiable values.

A plurality of normal (non-cancerous) mammographic images are processed in a pre-processing stage which applies various image processing algorithms such as filtering, morphological processing, and spot feature extraction, for example, to the incoming normal images to form normal clusters. The image data for the mammographic images are processed in a cluster selection step, based on a ground truth measure. The ground truth measure provides an indication of the degree of importance or involvement of a cancerous mammographic image or a true MCC cluster in MCC detection training. In embodiments of the present invention, a ground truth measure may be represented by different tests. One exemplary test is the number of true MCC clusters that are enclosed within a ground truth region that is defined by a radiologist. Exemplary cluster identifiable values may include density values, boundary values, morphological values, texture values, and distribution values, among others.

These identifiable values are input for evaluation to an identifiable value selection and MCC detector training stage. Since each identifiable value has been carefully chosen to separate cancer cases from normal cases, it is reasonable to expect that there will be some separation in identifiable value space between a set of normal candidates and a set of cancer candidates. Exemplary requirements state that the linear separation of each identifiable value be at least 55%, which means that 55%, or other suitable threshold percentage, of candidates be classified correctly with a linear classifier. The exemplary requirement leads to a single alternative: to use a linear classifier to evaluate the identifiable values. One alternative for a linear classifier is to assume a Gaussian distribution (with equal variances) and construct a classifier under this assumption. This alternative uses logic described in numerous basic statistics books, such as for a linear discriminator classifier, for example, and allows relatively straightforward implementation.

In general, identifiable value selection and detector training involve manual operations. The user must typically select or de-select identifiable value from a list. The updated identifiable value list is automatically saved and can be compared to other identifiable value sets by classifying with a linear classifier or Neural Network (NN). The user also has the ability to view histograms of each identifiable value and scatter plots of identifiable values (in 2 dimensions), comparing cancerous lesions and normal areas, which also helps in assessing the relative quality of identifiable values.

One alternative is to automatically analyze the identifiable values, selecting the best combination. A disadvantage of this approach is that there is no clear method to determine what the best combination of identifiable values might be. First, criteria must be defined (most likely including a classification or distance metric, separating normal regions from cancerous lesions). Secondly, a systematic procedure to combine identifiable values must be defined. At the extreme, every combination of n identifiable values can be processed. However, this may be very time consuming depending on the criteria. Another option is to start with an empty set of identifiable values and iterate, adding the 'best' identifiable value at each iteration, until the criteria metric no longer significantly improves.

Here, detector training refers to the process involving 'training' data (a subset of the overall data that have been determined as normal or cancerous) which are selected identifiable values. In the case of NN logic, training involves using the training data to tune the NN's weights.

A NN can be described as a system of weights connected by non-linear activation functions. The activation function is usually a "squashing" function, such as a hyperbolic tangent, which forces all inputs to the range of (−1,+1). To train, the NN uses the true class of each candidate to compute an error function. For example, the square error is the square of the difference between the output of the NN and the true class of the candidate. In the worst case, the square error is 4 and in the best case the square error is 0. Each candidate is processed through the NN and the error is computed. The error is then fed back through the network and each weight is updated in a manner that reduces the error. The degree to which each weight is adjusted is determined by a user parameter called the learning rate, which scales the weight update factor. The user also decides on the overall size of the NN, which in turn determines the degree of complexity of the NN.

Several parameters of the NN can be adjusted (such as the error function, the activation function, and the update procedure, for example), but the two mentioned earlier (learning rate and size) are the most important. The NN learning level can be evaluated by plotting the mean square error (MSE) of all the candidates as the NN is trained. Given a subset of candidates that is not used to train, but is evaluated each iteration, the user can observe how well the NN generalizes to new data. Generally, in a well trained NN, the test or evaluation data's MSE follows the training MSE closely. The test MSE will tend to be greater than the training MSE, but the relative closeness of the two is more important. As these diverge, it indicates that the NN is memorizing the training data. A trained MCC detector is used for MCC detection.

The present invention is described as a method. However, in another preferred embodiment, the present invention comprises a computer program product for image linear structure detection in medical applications in accordance with the method described. In describing the present invention, it should be apparent that the computer program of the present invention can be utilized by any well-known computer system, such as the personal computer. However, many other types of computer systems can be used to execute the computer program of the present invention. Consequently, the computer system will not be discussed in further detail herein.

It can be understood that the computer program product of the present invention may make use of image manipulation algorithms and processes that are well known. Accordingly, the present description will be directed in particular to those algorithms and processes forming part of, or cooperating more directly with, the method of the present invention. Thus, it will be understood that the computer program product embodiment of the present invention may embody algorithms and processes not specifically shown or described herein that are useful for implementation. Such algorithms and processes are conventional and within the ordinary skill in such arts.

Additional aspects of such algorithms and systems, and hardware and/or software for producing and otherwise processing the images or co-operating with the computer program product of the present invention, are not specifically shown or described herein and may be selected from such algorithms, systems, hardware, components and elements known in the art.

Processing results from methods and apparatus of the present invention can be displayed on a control monitor, for example, or can be reported to a viewer or provided, as data, to a computer or processor for subsequent image processing and analysis. Linear structures and microcalcifications that are detected by the method of the present invention can be highlighted on the display, for example.

The computer program for performing the method of the present invention can be stored in a computer readable storage medium. This medium may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of the internet or other communication medium. Those skilled in the art will readily recognize that the equivalent of such a computer program product may also be constructed in hardware.

It will be appreciated that variations and modifications can be effected by a person of ordinary skill in the art without departing from the scope of the invention. The subject matter of the present invention relates to digital image processing and computer vision technologies, which is understood to mean technologies that digitally process a digital image to recognize and thereby assign useful meaning to human understandable objects, attributes or conditions, and then to utilize the results obtained in the further processing of the digital image.

All articles and other publications mentioned in this specification are hereby incorporated by reference into this specification.

The invention has been described in detail with particular reference to presently preferred embodiments, but it will be understood that variations and modifications can be effected within the scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A method for detecting a linear structure in a digital mammographic image, executed at least in part on a processor or computer, comprising:
   locating at least one microcalcification candidate cluster in the image data;
   extracting a first region of interest that encloses the at least one microcalcification candidate cluster;
   processing the first region of interest to identify feature points that correspond to geometric structures in the first region of interest; and
   applying a linear detection algorithm by a repeated process comprising:
      (i) selecting a line model from a predefined set of line models;
      (ii) analyzing the line model to determine whether a linear structure is present in the first region of interest.

2. The method of claim 1 further comprising displaying one or more detected linear structures.

3. The method of claim 1 wherein the processing step comprises:
   generating a gradient magnitude region of interest from the first region of interest; and
   generating a binary region of interest containing the feature points from the gradient magnitude region of interest.

4. The method of claim 1 wherein selecting the line model comprises:
   selecting a radius of a circle that lies within the first region of interest;
   using the center of the first region of interest as a rotation center, rotating the radius either clockwise or counter clockwise over a range of angles with rotation at a constant discrete angular interval;
   recording horizontal and vertical coordinates of corresponding points on the circle when rotating the radius;
   for each recorded point on the circle, finding its opposite point on the circle with respect to the center of the rotation to form a pair of points which, in turn, defines the line model; and
   for each defined line model, generating a plurality of parallel lines with a constant Euclidean distance between neighboring lines.

5. The method of claim 4 further comprising, for each defined line model, generating a plurality of lines perpendicular to the plurality of parallel lines in the line model, with a constant Euclidean distance between neighboring perpendicular lines.

6. The method of claim 4 wherein the range of angles is between 0 and 180 degrees.

7. The method of claim 1 wherein the line detection algorithm is a modified RANSAC algorithm with said predefined set of line models.

8. The method as in claim 1 wherein the analyzing step further comprises:
   computing a first integral curve in a first direction that is parallel to a direction determined by the line model;
   computing a second integral curve in a second direction that is perpendicular to the first direction;
   computing a first peak-to-peak value for the first integral curve;
   computing a second peak-to-peak value for the second integral curve; and
   calculating a ratio of the first peak-to-peak value to the second peak-to-peak value to determine whether or not a true linear structure is present in the first region of interest.

9. The method of claim 8, further comprising using the calculated ratio in a classifier together with other identifiable intensity and geometrical values to detect microcalcifications in the image.

10. The method of claim 8 further comprising a step of training a classifier according to the calculated ratio.

11. A method for detecting one or more linear structures in a digital mammographic image, executed at least in part on a processor or computer, comprising:
   locating a plurality of microcalcification candidate clusters in the image data;
   extracting a region of interest that encloses at least one candidate cluster of the plurality of microcalcification candidate clusters;
   processing the region of interest to identify feature points that correspond to geometric structures in the region of interest;
   applying a linear detection algorithm by a repeated process comprising:
      (i) selecting a line model from a predefined set of line models, wherein the line model defines a direction; and
      (ii) analyzing the line model by integrating pixel values in the region of interest along lines parallel to the defined direction and along lines perpendicular to the defined direction, and using a ratio of peak-to-peak values from the analysis to determine whether the linear structure is present in the region of interest; and
   displaying the linear structure.

12. The method of claim 11 wherein the predefined set of line models are defined using a template.

13. The method of claim 12 wherein processing the region of interest further comprises:
   generating a gradient magnitude region of interest from the extracted region of interest; and
   generating a binary region of interest containing the feature points from the gradient magnitude region of interest.

* * * * *